(No Model.)

W. A. JAMESON.
ANIMAL TRAP.

No. 419,587. Patented Jan. 14, 1890.

Witnesses.
Chas. J. Buchheit.
Emil J. Neuhart.

W. A. Jameson, Inventor.
By Wilhelm Bonner,
Attorneys.

UNITED STATES PATENT OFFICE.

WILLIAM A. JAMESON, OF NIAGARA FALLS, NEW YORK.

ANIMAL-TRAP.

SPECIFICATION forming part of Letters Patent No. 419,587, dated January 14, 1890.

Application filed September 16, 1889. Serial No. 324,027. (No model.)

*To all whom it may concern:*

Be it known that I, WILLIAM A. JAMESON, a citizen of the United States, residing at Niagara Falls, in the county of Niagara and State of New York, have invented new and useful Improvements in Animal-Traps, of which the following is a specification.

This invention relates to animal-traps which are employed principally for catching fur-bearing animals, and which consist of two pivoted jaws between which the animal's leg is seized, a spring for closing the jaws, and a trigger whereby the jaws are held in an open or set position and to which the bait pan or plate is attached.

The object of my invention is to attach the jaws and the trigger and its supporting-bar to the base-plate or frame of the trap in a simple and inexpensive manner, and also to improve the construction of the jaws, so as to effectually hold the animal's leg in the trap without mutilating or cutting it.

Figure 1:
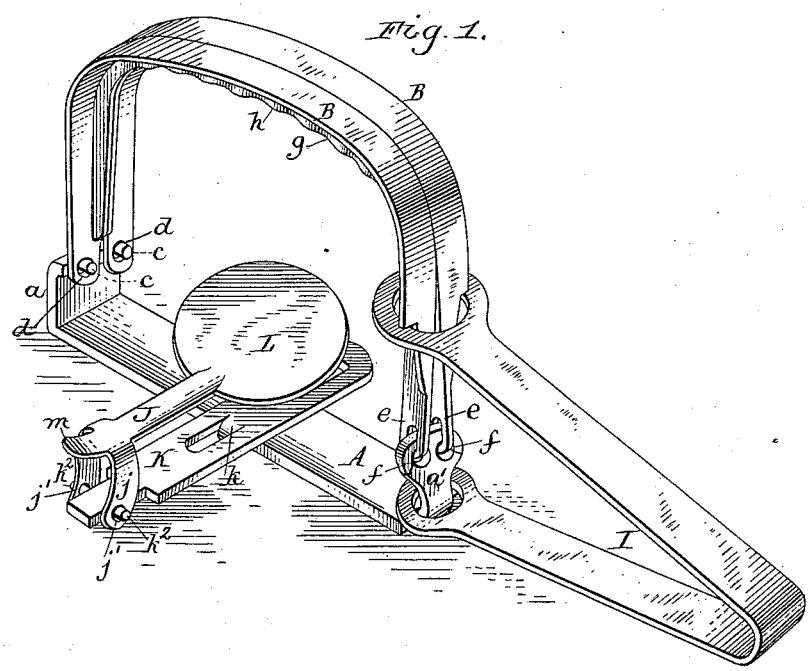
Figure 2:
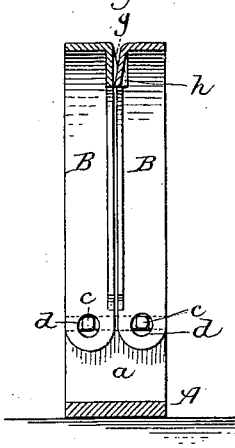
Figure 3:
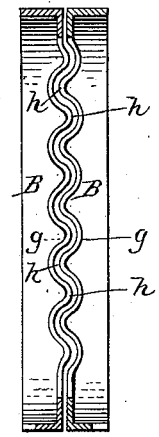
Figure 4:
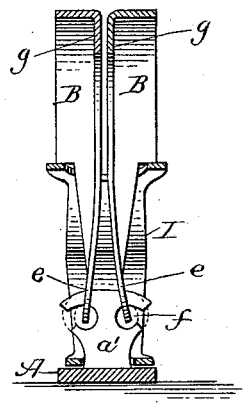
Figure 5:
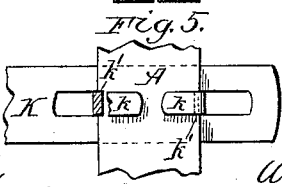

In the accompanying drawings, Figure 1 is a perspective view of my improved animal-trap. Fig. 2 is a vertical cross-section of the front portion thereof. Fig. 3 is an inverted horizontal section of the trap, showing the gripping projections or corrugations at the inner edges of the jaws. Fig. 4 is a vertical section of the trap, looking toward the rear end thereof, and showing the manner of attaching the rear ends of the jaws to the base-plate of the trap. Fig. 5 is a fragmentary bottom plan view, partly in section, showing the manner of securing the trigger-supporting bar to the trap.

Like letters of reference refer to like parts in the several figures.

A represents the base bar or plate of the trap, having its end portions bent upward to form posts or standards $a$ $a'$.

B B are the U-shaped jaws, which are pivoted at their ends to the posts $a$ $a'$. The front post $a$ is provided with inwardly-projecting horizontal pivots $c$, which enter openings $d$, formed in the adjacent front ends of the jaws B. The opposite ends of the jaws are provided with closed openings $e$, which are interlocked with eyes or openings $f$, formed in the upper end of the rear post $a'$. The eyes $f$ of the rear post are split or divided, and are stamped open, as represented in Fig. 4, so that the openings at the rear ends of the jaws may be engaged therewith. After the parts have been so engaged the split eyes of the post are closed by a cold-shut, as represented in Fig. 1, whereby the rear ends of the jaws are securely attached to the post. The base-plate A, with its posts or standards and the pivots formed on the front post, are stamped in one piece from a flat blank of sheet metal, and the posts and pivots are afterward bent to the proper form.

In attaching the jaws to the base-bar the openings at the front ends of the jaws are first passed over the horizontal pivots of the front post, and the openings at the rear ends of the jaws are then engaged with the open eyes of the rear post and the eyes closed. This forms a very simple, cheap, and convenient attachment for pivoting the jaws to the base-bar, which permits the parts to be connected without riveting, springing, or bending the jaws. If desired, the front ends of the jaws may be attached to the base-bar of the trap by interlocking eyes formed in the respective parts in a manner similar to the rear ends of the jaws.

The rear post $a'$ may be constructed with pivots instead of the split eyes, if desired. It is also obvious that the pivots $c$ may project outwardly instead of inwardly, if desired.

Each jaw B B is provided at its inner edge or margin with an inwardly-projecting flange $g$, which forms a wide gripping-face. The flanges $g$ are provided in their adjacent faces with ridges, projections, or teeth $h$, which embed themselves in the leg of the animal, and thereby more effectually confine it between the jaws. These gripping ridges or projections are comparatively blunt, so as not to cut the animal's leg, and are preferably formed by corrugating the flanges of the jaws transversely, as represented in the drawings. The corrugations are preferably so arranged that the elevations or ridges of one jaw stand opposite the depressions between the ridges of the other jaw, as shown in Fig. 3. The flanges $g$ preferably extend downwardly beyond the rear ends of the jaws and the pivot-eyes $e$ are formed in the ends of said flanges, as represented in Figs. 1 and 4.

I represents the spring whereby the trap is sprung, and which is attached with its lower branch to the base-bar of the trap and has its upper branch provided with an eye which embraces the two jaws in a well-known manner.

J represents the trigger whereby the jaws are held in an open or set position, and which is pivoted to a cross-bar K, secured to the base-bar A. The cross-bar K is secured to the base-bar A by means of ears or lips $k$, formed on the cross-bar, and which are bent or clinched around the sides of the base-bar, as represented in Fig. 5. The lips $k$ are formed by cutting openings or slits in the cross-bar and bending down the tongue of metal so formed, as clearly shown in Figs. 1 and 5.

The base-bar is provided with notches $k'$, in which the lips $k$ are seated, and whereby the cross-bar is held against displacement on the base-bar. This is a very simple and cheap fastening, which requires no rivets or bolts.

The trigger J is provided near its outer end with depending arms $j$, having openings $j'$ in their lower ends, which fit over horizontal pivots $k^2$, formed on opposite sides of the cross-bar K. The trigger and its arms are stamped in one piece of sheet metal. The trigger is attached to the cross-bar by bending its arms downwardly and inwardly, so as to pass the openings of the arms over the pivots on the cross-bar K. This forms a simple and cheap construction, which permits the trigger to be readily attached to the base-frame of the trap without the use of rivets or other fastenings.

L is the bait pan or plate, formed on or secured to the inner end of the trigger and arranged directly underneath the gripping-point of the jaws in the usual manner. The bait-pan is preferably stamped in one piece with the trigger.

The trap is set by depressing the upper branch of the spring I and engaging the adjacent jaw under the nose $m$ at the outer end of the trigger, in the usual way, the trap being sprung and the jaws closed upon depressing the bait-pan.

I claim as my invention—

1. In an animal-trap, the combination, with the base bar or plate having its end bent up to form a post or standard and provided with a horizontal pivot formed integral with said post, of a jaw provided with an opening engaging over said pivot, substantially as set forth.

2. In an animal-trap, the combination, with the base bar or plate having a post or standard provided with a split eye, of a pivoted jaw provided with an eye or opening engaging with the split eye of the base-bar and interlocked with said eye by a cold-shut, substantially as set forth.

3. In an animal-trap, the combination, with the base plate or bar provided at one end with a post having a horizontally-projecting pivot, and at its opposite end with a post having a split eye, of a pivoted jaw provided at one end with an opening fitting over said pivot, and at its opposite end with an eye which is interlocked with said split eye by a cold-shut, substantially as set forth.

4. The combination, with the base-bar of the trap, of the trigger-supporting bar K, provided with lips or ears which are bent or clinched around the base-bar, substantially as set forth.

5. The combination, with the base bar or plate provided with a post or standard having a split eye, of a pivoted jaw having an inwardly-projecting flange provided with an eye engaging with the split eye of the base-bar, substantially as set forth.

6. In an animal-trap, the combination, with the base bar or plate having horizontal pivots formed thereon, of the jaws, the spring for closing the jaws, and a trigger having depending arms provided with openings which fit over the pivots of the base plate or bar, substantially as set forth.

Witness my hand this 13th day of September, 1889.

WILLIAM A. JAMESON.

Witnesses:
JNO. J. BONNER,
F. C. GEYER.